Figure 3:
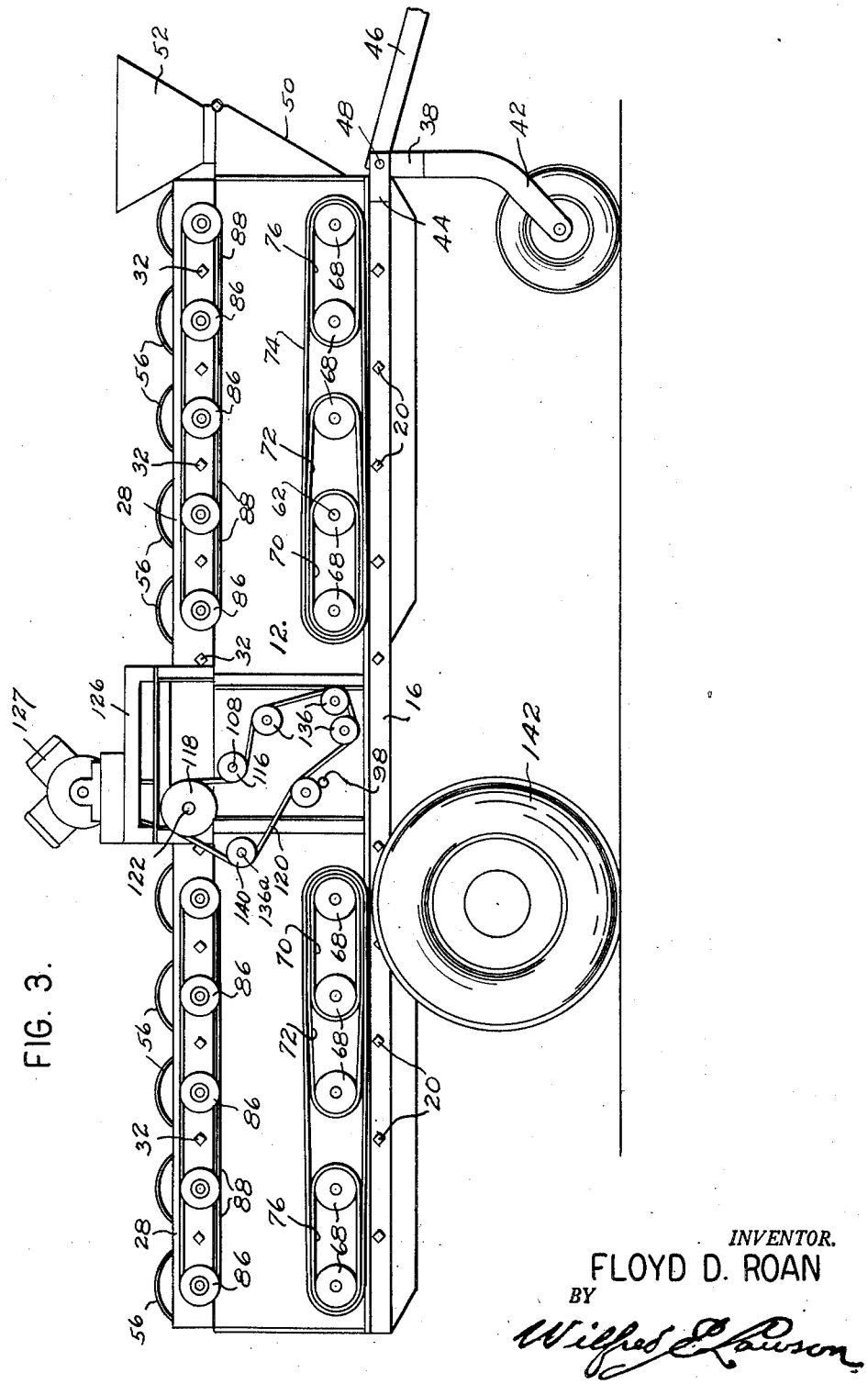

May 26, 1953  F. D. ROAN  2,639,469
PORTABLE COTTON CLEANER
Filed June 29, 1950  5 Sheets-Sheet 1
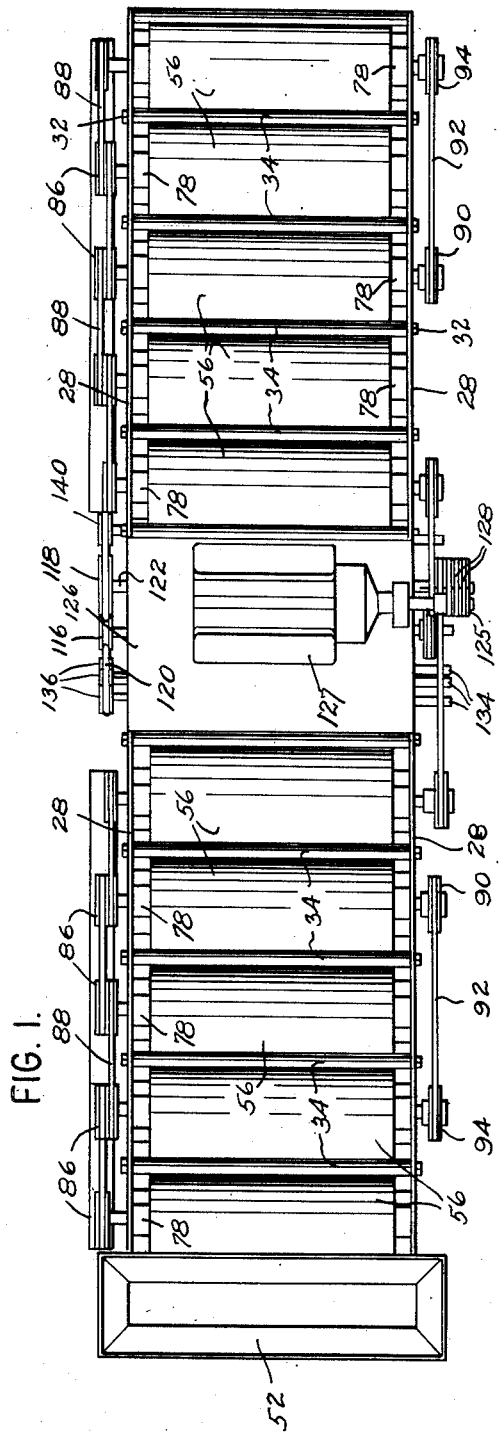
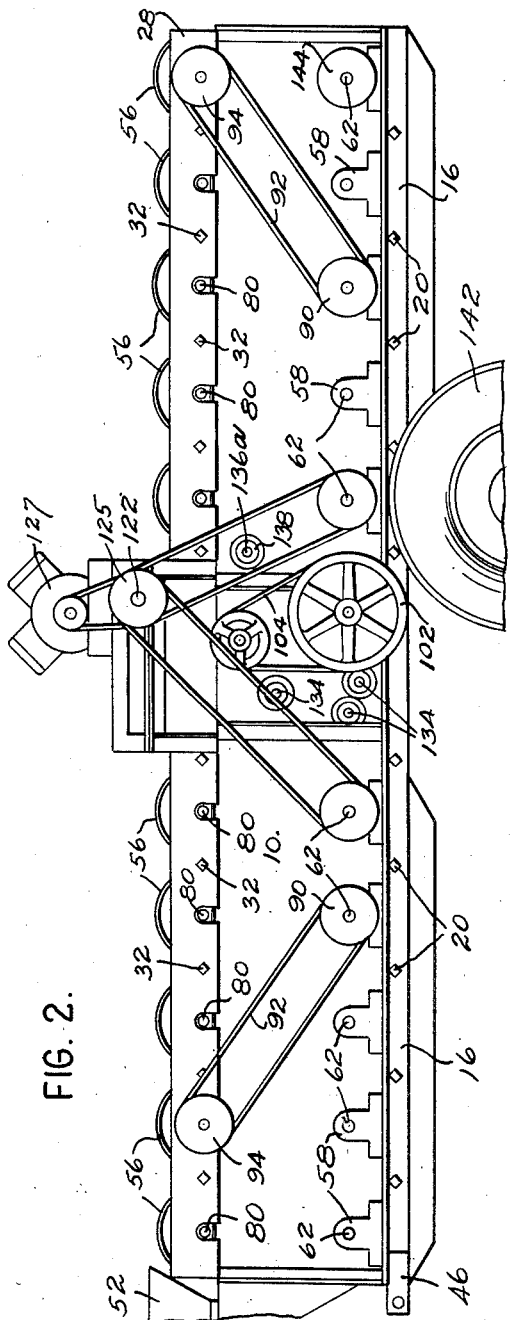
FIG. 1.
FIG. 2.
INVENTOR.
FLOYD D. ROAN
BY
Wilfred E. Lawson May 26, 1953  F. D. ROAN  2,639,469
PORTABLE COTTON CLEANER
Filed June 29, 1950  5 Sheets-Sheet 4

INVENTOR.
FLOYD D. ROAN
BY
*Wilfred Lawson*

May 26, 1953 F. D. ROAN 2,639,469
PORTABLE COTTON CLEANER
Filed June 29, 1950 5 Sheets-Sheet 5

INVENTOR.
FLOYD D. ROAN
BY
Wilfred E. Lawson

Patented May 26, 1953

2,639,469

UNITED STATES PATENT OFFICE 2,639,469

PORTABLE COTTON CLEANER

Floyd D. Roan, Lubbock, Tex., assignor of one-half to Thelmer A. Rogers, Lubbock, Tex., and one-half to The Lubbock Machine Company, Inc.

Application June 29, 1950, Serial No. 171,048

3 Claims. (Cl. 19—93)

This invention relates to a portable cotton cleaner and more particularly to a piece of mobile equipment adapted to be connected in trailing relation to a mechanical cotton picker of the type commonly employed in harvesting cotton.

It is well known that in the mechanical harvesting of cotton a great deal of undesirable material such as stems, burrs, leaves, and the like is carried through the picker with the result that the cotton when taken to the gin contains a large quantity of trash and like undesirable matter.

Since the cotton farmer is paid in accordance with the amount of clean cotton delivered after the ginning process, it is evident that much waste occurs in hauling to the gin the foreign matter which must be disposed of. Moreover the foreign matter removed by the gin must be disposed of and is usually burned or otherwise destroyed. This results in considerable loss of fertilizing value contained in the destroyed material which could be well employed by returning it to the field from which the cotton was harvested.

The primary object of this invention is to effect economies in the harvesting of cotton by avoiding the carrying of sticks, stems, leaves and the like to the cotton gin and also by depositing the sticks, stems and like trash back on the field from which the cotton is being harvested in order to gain the fertilizing value contained such trash.

Another object is to assure maximum financial return to the farmer for the amount of cotton delivered to the cotton gin.

Still another object is to remove from the picked cotton the sticks, stems, leaves and the like, and deposit them on the field as the picking of the cotton takes place.

The above and other objects may be attained by employing this invention which embodies among its features a portable cotton cleaner having a perforated bottom above which a group of agitators are mounted to rotate for agitating the cotton and separating the cotton fibers from sticks, stems and like foreign matter, and fans operating above the agitators for directing air downwardly against the cotton to assist in blowing the foreign matter from the cotton fibers.

Other features include burr removing equipment intermediate the ends of the mobile cotton cleaner for removing burrs, and the like carried by the fibrous material and depositing them on the field.

Still other features include a prime mover carried by the mobile cotton cleaner for operating the agitators, burr removing equipment and the fans in unison during the advance of the cotton through the cleaner.

In the drawings:

Figure 1 is a top plan view of a mobile cotton cleaner embodying the features of this invention, Figure 2 is a side view of the cleaner illustrated in Figure 1.

Figure 4:
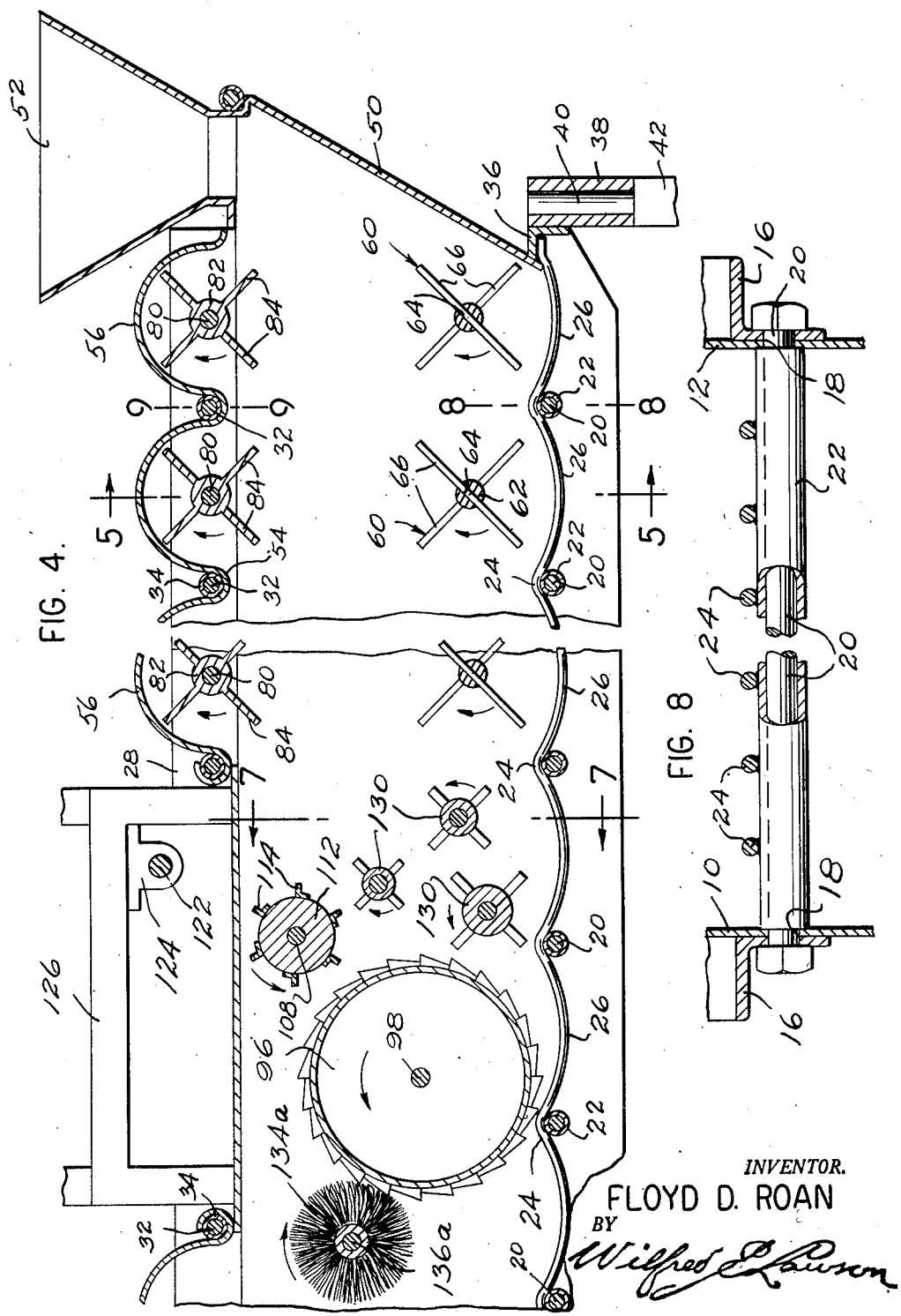
Figure 5:
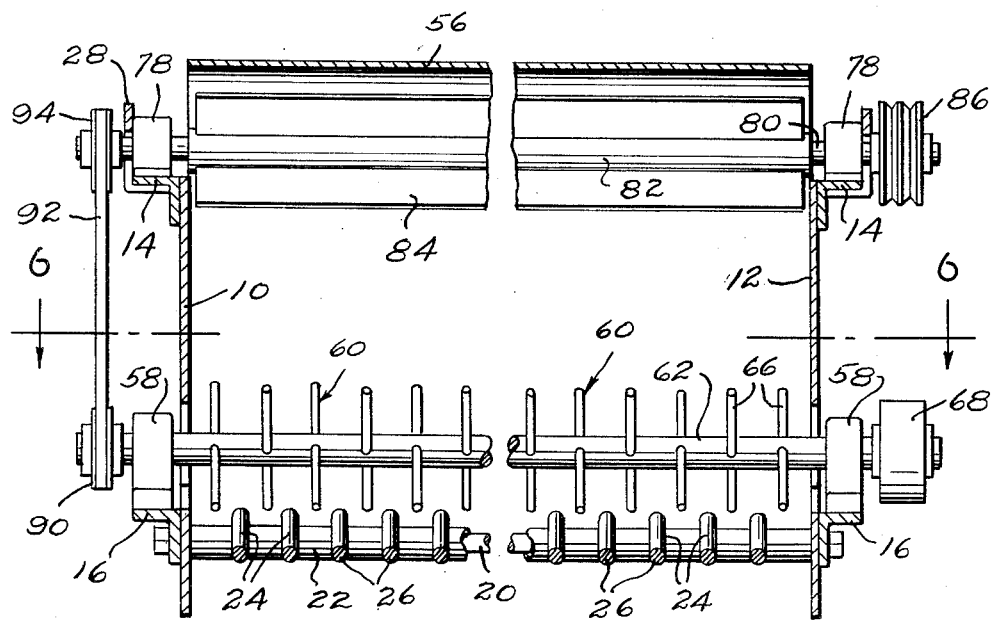
Figure 6:
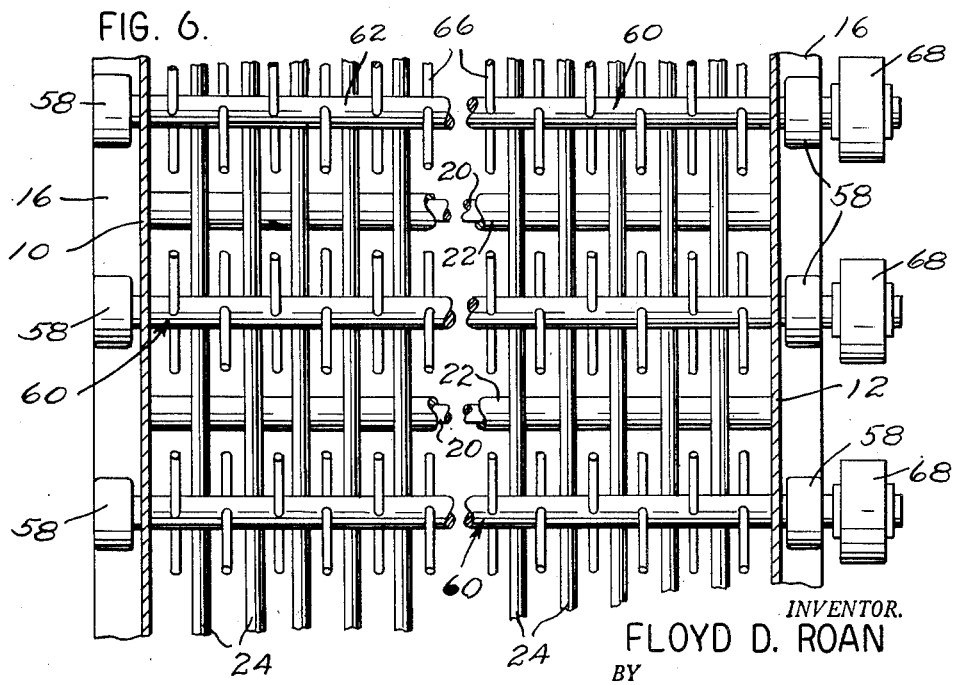
Figure 7:
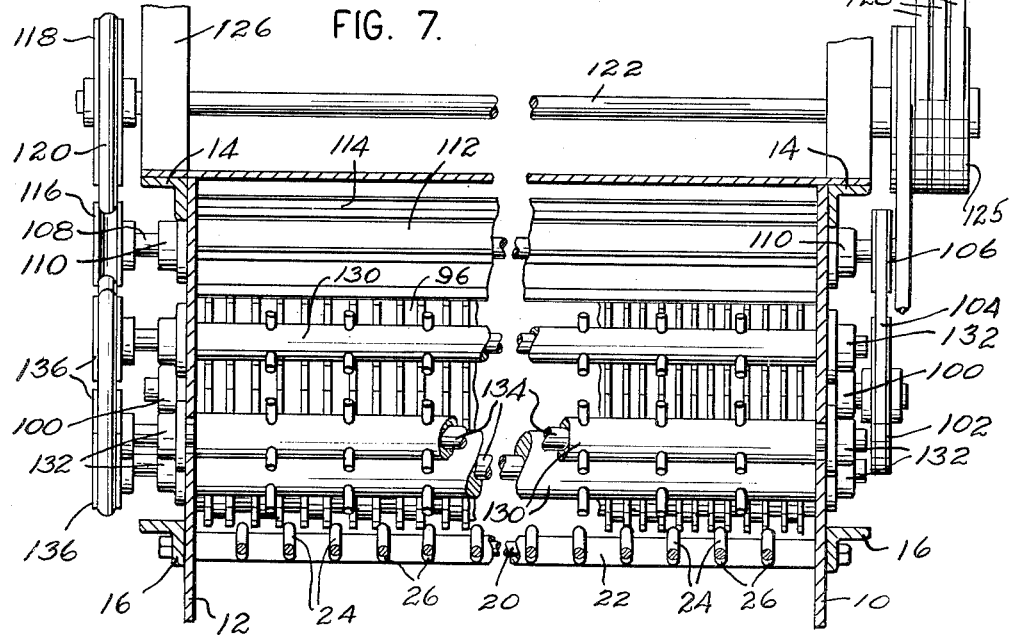
Figure 9:
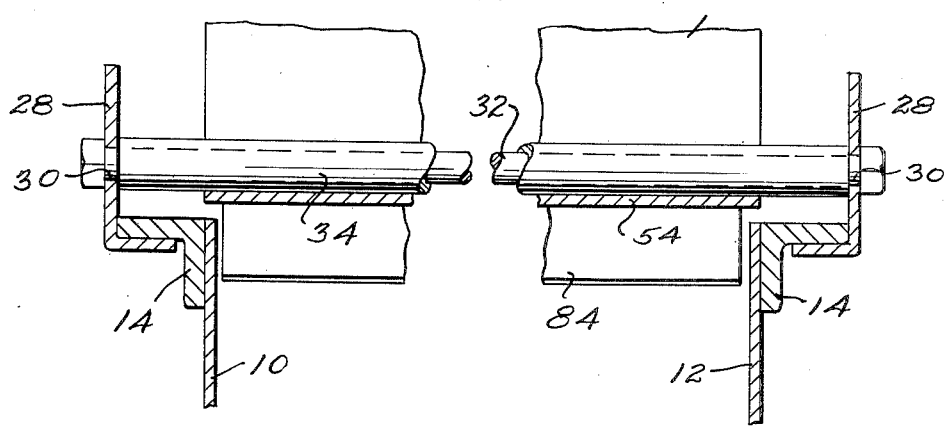

Figure 3 is a side view from the opposite side of the cotton cleaner illustrated in Figure 1, Figure 4 is a fragmentary enlarged vertical sectional view through the cotton cleaner illustrated in Figures 1 through 3 inclusive, Figure 5 is a vertical sectional view taken substantially along the line 5—5 of Figure 4, Figure 6 is a horizontal sectional view taken substantially along the line 6—6 of Figure 5, Figure 7 is a vertical sectional view taken substantially along the line 7—7 of Figure 4, Figure 8 is a sectional view taken substantially along the line 8—8 of Figure 4, and Figure 9 is an enlarged fragmentary sectional view taken substantially along the line 9—9 of Figure 4.

Referring to the drawings in detail the invention comprises a carriage formed of a pair of spaced parallel side panels 10 and 12 each carrying adjacent their upper edges angle bars 14 each having an outwardly extending leg or flange which lies substantially flush with the top edge of its respective side panel. Secured to each side panel near its lower edge is an angle bar 16 having its horizontal flange or leg disposed upwardly in spaced parallel relation with the top flange or leg of the top angle bar 14. The angle bars 16 and the panels 10 and 12 are pierced at spaced intervals with aligning openings 18 for the reception of through bolts 20 which extend transversely between the panels and are surrounded by spacing sleeves 22 by which the panels are held in spaced parallel relation. Welded or otherwise secured to the sleeves 22 are spaced parallel longitudinally extending bars 24 which curve downwardly between the spacing sleeves 22 as at 26 to clear the agitators to be more fully hereinafter described. As shown, these bars 24 are spaced apart transversely of the structure and located near the lower edges of the side panels 10 and 12 so as to form a perforated bottom through which trash, carried by the cotton into the space between the side panels 10 and 12, may be discharged.

Welded or otherwise attached to the angle bars 14 at the upper edges of the side panels 12 are upstanding walls 28 which are pierced at spaced intervals with aligning openings 30 for the reception of through-bolts 32 which, like the through-bolts 20, are surrounded by spacing sleeves 34 which extend transversally across the machine and engage the walls 28 to hold the side panels 10 and 12 in spaced parallel relation.

Extending transversely between the side panels 10 and 12 adjacent to the forward end of the machine, and near the lower edges of the side panels, is a transversely extending angle bar 36 carrying midway between opposite ends a vertically extending sleeve 38 in which the spindle 40 of a caster wheel 42 is mounted to rotate and welded or otherwise attached to the angle bars 16 adjacent to the forward ends thereof are forwardly extending arms 44 to which a suitable draft tongue 46 is pivotally connected as at 48. An upwardly and forwardly extending wall 50 is carried by the side panels adjacent to the forward ends thereof and carried at the upper end of said wall is a filling hopper 52 into which cotton is delivered from the cotton picker to which the device is attached by the draft tongue 46. It will thus be seen that the cotton delivered into the hopper 52 will be directed downwardly and rearwardly by the wall 50 into the space between the side panels 10 and 12 to rest on the perforated bottom formed by the bars 24. Welded or otherwise supported on the spacing sleeves 34 is a strip of metal 54 which is arched as at 56 between the sleeves 34 and the tie bolts 32 so that the upper ends of the arched portions extend above the top edges of the side walls 28 to form free air passages by which air may enter the space between the side panels 10 and 12.

Supported in suitable bearings 58 carried by the angle bars 16 and extending transversely of the device through the side panels 10 and 12 are rotary beaters 60 each of which comprises a shaft 62 which is provided at longitudinally spaced points with transversely extending openings 64 in which bars 66 forming the beater arms are extended. These bars are of a length to pass closely to the curved portions 26 of the bars 24 so that cotton delivered into the device will be agitated and moved toward the rear end of the device. Such agitation of course tends to loosen sticks, stems and like debris from the fibrous body of the cotton so that they will fall between the bars 24 and be deposited on the ground as the cleaner advances. Each shaft 62 carries on the end which projects through the panel 12, a drive pulley 68 and these drive pulleys 68 are belted together, as illustrated in Figure 3, by a short belt 70, an intermediate belt 72 and a long belt 74, which extends completely around the pulleys 68 adjacent to opposite ends of the machine. The pulleys 68 nearest the opposite ends of the machine are belted by a short belt 76 so that when one of the shafts 62 is rotated, all of the shafts 62 will be driven in unison.

Carried by each angle bar 14 on the inside of its respective wall 28, are bearings 78 in which fan shafts 80 are journaled. These fan shafts are located midway between the through bolts 32 and carry fans 82, the blades 84 of which rotate in arcs which lie substantially concentric to the arched portions 56 of the plate 54. Drive pulleys 86 are carried by the shafts 80 adjacent to the ends thereof nearest the side panel 12, and these pulleys 86 are belted together by V-belts 88 so that when one of the shafts 80 is rotated, all of the shafts will rotate in unison therewith.

As illustrated in Figures 2 and 6 two of the shafts 62 are provided adjacent to the side panel 10, with drive pulleys 90 which have driving connection through the medium of V-belts 92 with drive pulleys 94 carried by two of the shafts 80 so that when the shafts 62 are driven, the shafts 80 will also be driven in unison therewith. It will thus be seen that as the beaters 60 operate on the cotton to loosen the sticks, stems and the like therefrom, the fan blades 84 will be driven to direct a blast of air against the cotton from the top thereof so as to facilitate the removal of the undesirable matter from the cotton and discharge it between the bars 24.

In order to further facilitate the removal of undesirable matter from the fibrous cotton, I provide substantially midway between opposite ends of the side panels 10 and 12, burr removing equipment comprising a saw 96 of the type conventionally employed in a cotton gin. This saw 96 is carried on a shaft 98 which is mounted for rotation in bearings 100 carried by opposite side panels 10 and 12. A drive pulley 102 is mounted on one end of the shaft 98 and has driving connection through the medium of the drive belt 104 with a pulley 106 carried by a shaft 108 which is mounted for rotation in bearings 110 carried by the side panels 10 and 12 above the bearings 100. Mounted on the shaft 108 for rotation therewith is a stripper cylinder 112 which carries on its periphery radiating blades 114 which rotate in an arc near the periphery of the saw 96 on the side thereof toward which the cotton is moved. A drive pulley 116 is carried on the shaft 108 adjacent the end thereof remote from the pulley 106 and has driving connection with a main drive pulley 118 through the medium of a belt 120. The drive pulley 118 is carried on a main drive shaft 122 which is mounted to rotate transversely of the machine in suitable bearings 124 which are carried by a superstructure 126 which in turn is carried by the side panels 10 and 12. Mounted on the drive shaft 122 adjacent to the end remote from the drive pulley 118, is a multiple V-belt pulley 125 which has driving connection with a prime mover 127 through the medium of a group of V-belts 128. It will thus be seen that when the prime mover is set into operation, power will be transmitted through the shaft 122 and belt 120 to the stripper cylinder 112 and thence through the pulley 106, belt 104 and pulley 102 to the saw 96. A group of pickers 130 are mounted in bearings 132 carried by the side panels 10 and 12 and mounted on the shafts 134 of the pickers 130 are drive pulleys 136 around which the belt 120 is trained so that when the drive shaft 122 is rotated, the pickers 130 will rotate in unison with the saw 96 and the stripper 112. The pickers 130 are located between the saw and the beaters 60 which advance the cotton toward and into the saw 96 for further cleaning, while the stripper 112 knocks the burrs and like matter back into the chamber through which the cotton is being advanced toward the saw, for discharge through the perforated bottom formed by the bars 24.

In order to remove the cotton fibers from the saw 96 a brush 134a is carried on a shaft 136a which is mounted in suitable bearings 138 carried by the side panels 10 and 12, and this brush is driven by means of a drive pulley 140 over which the drive belt 120 is trained.

Suitable supporting wheels 142 are mounted for rotation on an axle shaft which extends transversely beneath the side panels 10 and 12 and is coupled thereto in any conventional manner so as to cooperate with the castor wheel 42 in providing mobility for the cleaner. In the preferred form of the invention, a power takeoff pulley 144 is carried by the shaft 62 adjacent the rearmost end of the machine for connection to an elevator by which cotton delivered from the rear end of the cleaner may be transferred to a mobile bin for subsequent transportation to the cotton gin.

In operation it will be understood that cotton leaving the cotton picker, to which this cotton cleaner is connected by means of the draft tongue 46, is delivered into the hopper 52 and falling downwardly along the inclined wall 80 it will be engaged by the foremost beater or agitator 60 and transferred thereby along the bars or rails 24 to the next agitator or beater, finally arriving to a point adjacent the auxiliary cleaning mechanism from whence it is engaged by the pickers 130 and moved into contact with the saw 96. As the fibrous cotton is engaged by the teeth of the saw 96 and moved upwardly, the radial blades 116 of the stripper 112 will knock loose any burrs or other foreign matter so as to prevent it from being carried by the saw into the rear portion of the cleaner. As the saw 96 revolves, the fibrous cotton will be carried therearound and into contact with the rotary brush 134 which removes the cotton from the saw and delivers it into the rear half of the machine where it is again engaged by beaters or agitators 60 to be moved along the rails or bars 24 to the rear end of the machine. It may be delivered in a clean condition to an elevator by which it will be deposited in a mobile bin which may be attached to the rear end of the cleaner in any conventional manner. Obviously, as the bin becomes filled, it may be detached and another bin coupled to the cleaning device so that the filled bin may be delivered to the gin while the picking and cleaning operation continues. In this way cleaned cotton may be delivered to the cotton gin by the farmer while the debris separated from the cotton fibers is deposited on the ground during the picking operation in order to supply fertilizer thereto. As a consequence by employing this invention the farmer not only gains by delivering clean cotton to the gin, but also by employing the trash which has been separated from the cotton as fertilizer.

While in the foregoing there has been shown and described the preferred form of this invention, it is to be understood that minor changes in the details of construction, combination and arrangement of parts may be resorted to without departing from the spirit and scope of the invention as claimed.

I claim:

1. In a mobile cotton cleaner of the character set forth, an elongate structure comprising spaced parallel side walls and a front wall, a longitudinal bottom between the lower portions of the side walls, comprising longitudinal bars spaced to provide debris discharging openings, longitudinally spaced rotary beaters supported transversely above the bottom between said side walls, a plurality of elongate fans spaced longitudinally of the structure and rotatably supported between the side walls at the tops thereof to drive air downwardly against the beaters, means for introducing cotton into the structure at the top and adjacent to the front wall, means extending across between the tops of the side walls providing a plurality of arched open end covers each overlying a fan, each of said covers having a portion at each end extending above the top of the adjacent side wall to provide an air entrance opening, and burr removing mechanism supported transversely of the structure at a position midway of the ends of the latter between said side walls and a forward and rear series of beaters.

2. The invention according to claim 1, wherein said cover providing means comprises a single sheet of material for a number of grouped fans, bent to provide a like number of joined covers, and transverse bolts joining the tops of the side walls, certain of said bolts lying between and joined to the covers.

3. In a mobile cotton cleaner of the character set forth, an elongate structure comprising spaced parallel side walls and a front wall, a longitudinal bottom between the lower portions of the side walls, comprising longitudinal bars spaced to provide debris discharging openings, longitudinal flanges carried by said walls on the outside and adjacent to the bottom edges thereof, longitudinal flanges carried by said walls upon the outside and adjacent to the top edges thereof, bearing units carried by the lower flanges and aligned transversely of the structure, longitudinally spaced rotary beaters in and disposed transversely of the lower part of the structure and including shafts supported at their ends in aligned bearings, a longitudinal low vertical wall secured to and extending along the outer edge of each of the top flanges, bearing units carried by the top flanges and aligned transversely of the structure, a plurality of elongate fans spaced longitudinally of the structure and including shafts, supported at their ends in aligned bearings on the top flanges, bolts extending transversely of the structure between and connecting said low walls the bolts lying between adjacent fans, cover means for a number of adjacent fans comprising a sheet of material lying between the low walls across the structure and having upwardly arching transverse portions each forming a cover over a fan and downwardly arching portions each passing under and connected with a bolt, the top part of each upwardly arching portion rising above the top edge of the adjacent low wall to provide an air inlet opening, means connected with the beater shafts and with the fan shafts for rotating the same, means for introducing cotton into the structure at the top and adjacent to the front wall, and burr removing mechanism supported transversely of the structure at a position midway of the ends thereof, between said side walls and a forward and a rear series of beaters.

FLOYD D. ROAN.

References Cited in the file of this patent

UNITED STATES PATENTS

| Number | Name | Date |
|---|---|---|
| 1,005,034 | Hitchon | Oct. 3, 1911 |
| 2,079,547 | Court | May 4, 1937 |
| 2,421,478 | Blewett | June 3, 1947 |
| 2,526,535 | Brown | Oct. 17, 1950 |